US010029940B1

United States Patent
Geerlings et al.

(10) Patent No.: US 10,029,940 B1
(45) Date of Patent: *Jul. 24, 2018

(54) LASER-SEPARATED EDGES WITH CONTROLLED ROUGHNESS

(71) Applicant: GENTEX CORPORATION, Zeeland, MI (US)

(72) Inventors: Kurtis L. Geerlings, Zeeland, MI (US); David J. Cammenga, Zeeland, MI (US); Donald L. Bareman, Zeeland, MI (US); William L. Tonar, Holland, MI (US)

(73) Assignee: GENTEX CORPORATION, Zeeland, MI (US)

(*) Notice: Subject to any disclaimer, the term of this patent is extended or adjusted under 35 U.S.C. 154(b) by 191 days.

This patent is subject to a terminal disclaimer.

(21) Appl. No.: 14/614,117

(22) Filed: Feb. 4, 2015

Related U.S. Application Data (60) Provisional application No. 61/935,834, filed on Feb. 4, 2014.

(51) Int. Cl.
B23K 26/00 (2014.01)
C03B 33/02 (2006.01)

(52) U.S. Cl.
CPC .................. *C03B 33/0222* (2013.01)

(58) Field of Classification Search
CPC .................................... B23K 26/0087
USPC ............................................ 428/43
See application file for complete search history.

(56) References Cited

U.S. PATENT DOCUMENTS 8,842,358 B2 * 9/2014 Bareman ............... G02F 1/157
359/267
2013/0126573 A1 * 5/2013 Hosseini ............ B23K 26/0057
225/2

* cited by examiner

*Primary Examiner* — Brent T O'Hern
(74) *Attorney, Agent, or Firm* — Foley & Lardner LLP; Bradley D. Johnson (57) ABSTRACT

The roughness of a separation surface formed along a process path along which a plurality of laser-induced channels is formed in a substrate can be controlled through process parameters. Laser pulse power can be varied to vary the resulting roughness. Higher laser pulse power can form larger laser-induced channels, enabling larger inter-channel spacing and/or higher roughness in applications where it is desired. Lower laser pulse power can be employed to achieve smoother separation surfaces when desired.

11 Claims, 6 Drawing Sheets

LASER-SEPARATED EDGES WITH CONTROLLED ROUGHNESS

TECHNICAL FIELD

The present disclosure generally relates to manufacturing processes that use lasers and, more particularly, to processes that use lasers to separate material into two or more separate portions of material.

BACKGROUND

A substrate material can be separated into two or more pieces by forming a plurality of laser-induced channels along a process path located along an intended line of separation, as taught by Bareman et al. in U.S. Pat. No. 8,842,358. A laser-induced channel edge can be formed upon substrate separation and can have a relatively smooth surface without the need for post-processing operations such as grinding.

SUMMARY

In accordance with one or more embodiments, a method includes the steps of: (a) forming a plurality of laser-induced channels in a substrate along a process path; (b) separating the substrate into first and second portions along the process path, each of the first and second portions having a separation surface defined in part by the laser-induced channels; and (c) controlling the roughness of the separation surfaces by adjusting a process parameter.

In accordance with one or more embodiments, a laser system is configured to form a plurality of laser-induced channels along a process path on a substrate. The laser system includes a laser that emits a laser beam with a characteristic power distribution across the width of the beam and an optical element configured to alter the power distribution in a manner that provides a desired focal energy distribution at a focal region that coincides with the substrate. The laser system has a maximum available pulse energy and the substrate has a minimum characteristic pulse energy that forms the laser induced channels with a desired length within the thickness of the substrate. The minimum characteristic pulse energy is less than the maximum available pulse energy. The laser system is adjustable to adjust a separation surface roughness when the substrate is separated along the process path after formation of the laser-induced channels.

In accordance with one or more embodiments, a product includes a substrate having opposite first and second surfaces and a separation surface extending between the first and second substrate surfaces. The separation surface is partly defined by a plurality of laser-induced channels extending between the first and second substrate surfaces, and the roughness of the separation surface is a function of the size of the laser-induced channels and/or the spacing between adjacent laser-induced channels.

BRIEF DESCRIPTION OF THE DRAWINGS

Illustrative embodiments will hereinafter be described in conjunction with the appended drawings, wherein like designations denote like elements, and wherein.

DETAILED DESCRIPTION OF ILLUSTRATIVE EMBODIMENTS

Figure 1:
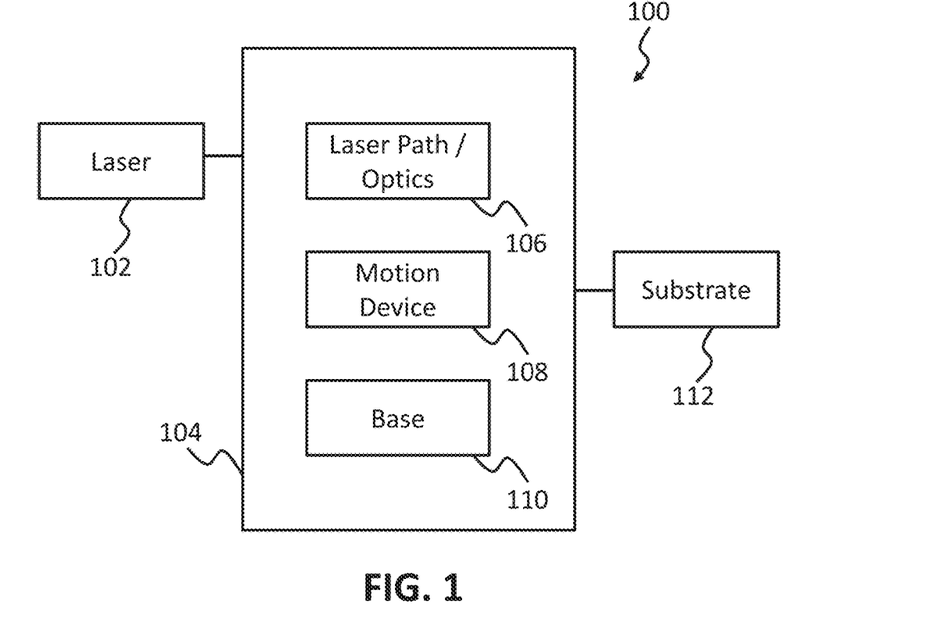
FIG. 1 is a schematic diagram of an illustrative laser system.

With reference to FIG. 1, a laser system 100 is diagrammatically illustrated. The illustrated embodiment includes a laser 102 in optical communication with a laser delivery assembly 104. The laser delivery assembly 104 may include a laser path or optics 106, a laser motion device 108, and a base 110, as shown, and is configured to direct a beam of laser light (i.e., a laser beam) emitted by the laser 102 toward a substrate 112 that is to be processed.

The laser motion device 108 generally operates to change, control, monitor and/or determine the relative location and/or orientation of a portion of the laser beam that impinges the substrate 112 and may do so via appropriate movement of the laser beam and/or the substrate relative to a Cartesian coordinate system and/or about various axes. For instance, the motion device 108 may include servo motors, controllers, sensors, optical elements, and other components configured to change the location and/or orientation at which the laser beam impinges the substrate 112. The motion device 108 may include its own optical elements separate from the laser path or optics 106, which may be arranged between the laser 102 and the motion device.

Figure 2:
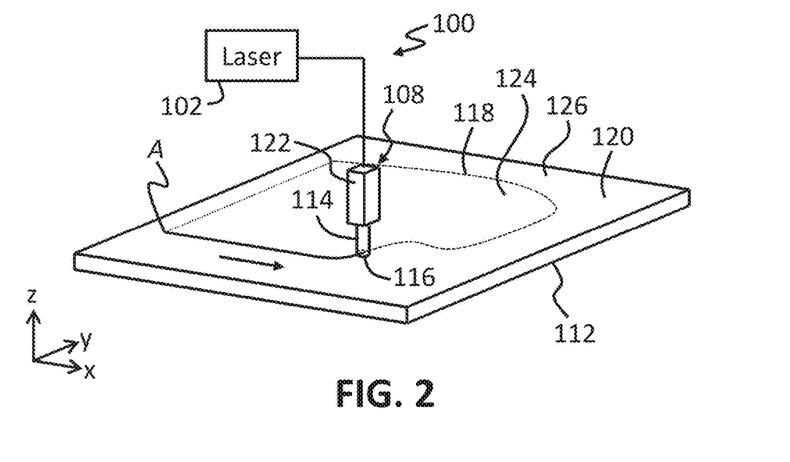
FIG. 2. is a perspective view of an illustrative laser system processing a substrate.

With reference to FIG. 2, one process parameter of the laser system 100 that is influenced by the motion device 108 is the speed or velocity at which a laser spot 116 moves with respect to the substrate 112. In some embodiments, the motion device 108 is configured to move the laser spot 116 with respect to the substrate 112 at a constant speed. More particularly, the motion device 108 (only a portion of which is illustrated) can be configured to direct the laser beam 114 with respect to the substrate 112 so that the laser spot 116 moves along a process path 118 at a constant speed. The laser spot 116 is defined where the laser beam 114 impinges a surface 120 of the substrate 112. Where the substrate 112 is at least partially transparent to the particular wavelength of laser light generated by the laser 102 (e.g., certain glass materials), the impingement surface 120 may be considered an entry surface. As used herein, the speed of the laser spot 116 is the magnitude of the velocity of the laser spot 116 as measured along the process path 118 in the instant direction of movement. In other words, when the laser spot 116 is moving at a constant speed along the process path 118, the magnitude of its velocity may be increasing or decreasing in other directions.

In the example illustrated in FIG. 2, the processed portion of the process path 118 is indicated by a solid line, and the unprocessed portion is indicated by a dotted line. The process starting point is indicated at point A, and the starting direction of movement is in the x-direction. Beginning at point A, the laser spot 116 may move at a constant speed along the process path 118. In this example, this means that the laser spot 116 moves away from point A at the same constant velocity in the x-direction and at a different constant velocity (i.e., zero) in the y-direction. Where the process path 118 of FIG. 2 curves toward the y-direction, the magnitude of the laser spot 116 velocity decreases and increases in the respective x- and y-directions while remaining constant along the process path.

Moving the laser beam 114 and laser spot 116 at a constant speed along the process path 118 is advantageous when the laser system 100 is configured to deliver the laser beam to the substrate in pulses at a designated frequency so that the locations at which the laser affects the substrate material are evenly spaced along the process path 118. For instance, with a laser system 100 configured with a pulse frequency of 100 kHz, movement of the laser spot 116 along the process path 118 at a constant speed of 500 mm/sec results in laser pulses delivered to the substrate every 5 μm along the process path 118. Other exemplary speeds are 250 mm/sec and 125 mm/sec, and other exemplary laser pulse frequencies are 200 kHz and 400 kHz. Other laser movement speeds and pulse frequencies are possible, and each can affect the spacing of laser-induced channels or other laser-affected material portions along the process path. It is also possible to vary the speed of the laser spot 116 along the process path 118 and may be possible to change the laser pulse frequency along the process path as well. In at least some embodiments, the spacing between adjacent channels is in a range from 1 μm to 40 μm. In other embodiments, the spacing between adjacent channels is in a range from 5 μm to 40 μm.

In the laser system 100 depicted in FIG. 2, the laser motion device 108 includes an optical assembly 122 through or along which the laser beam 114 travels on its way from the laser 102 to the substrate 112. The motion device 108 may include other non-illustrated components as well, such as a structural portion, a motor portion, and/or other components. The optical assembly 122 includes one or more optical elements. Each optical element is configured to change the direction, size, shape, energy density, energy distribution, or other characteristic of the laser beam 114. Some examples of optical elements include mirrors, reflectors, lenses, magnifiers, diffusers, prisms, and apertures. In some cases, an optical element can provide multiple beam-changing functions. For example, a concave mirror may reflect or change the direction of the laser beam while simultaneously focusing the beam.

Figure 3:
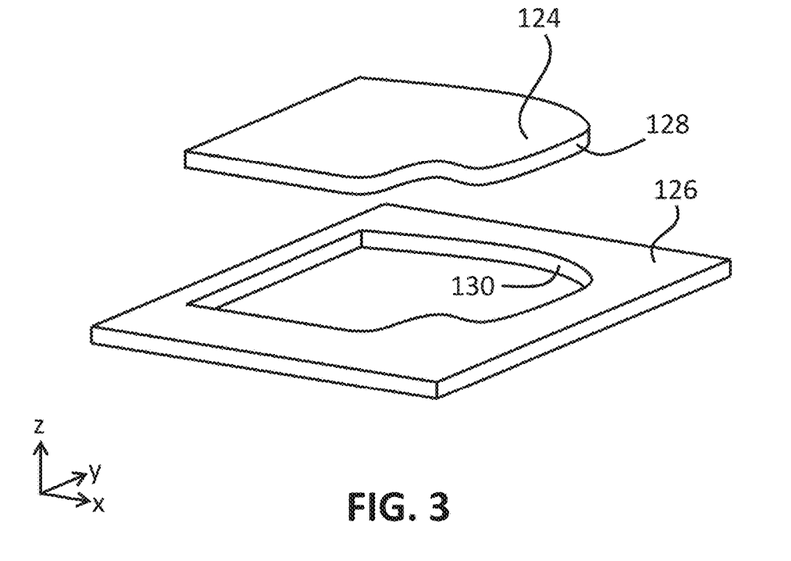
FIG. 3 is a perspective view of first and second portions of the substrate of FIG. 2 after separation.

In embodiments where the substrate 112 is at least partially transparent to the particular wavelength of the laser light from the laser 102, it is possible to form a series of spaced-apart laser-induced channels along the process path 118, with each of the channels extending at least partially through the thickness of the substrate (i.e., in the z-direction of FIG. 2). Laser-induced channels are described in further detail below and are useful to facilitate separation of the substrate 112 into separate portions, such as inner and outer portions 124, 126, along a line of separation defined at least in part by the process path 118. Each laser-induced channel may be characterized by a columnar volume of material within the substrate 112 along which the substrate material has been damaged or otherwise altered. With the application of chemical processes, physical stress, thermal stress, time, or a combination thereof, cracks, (e.g., microcracks) may form between adjacent laser-induced channels along most or all of the length of the process path 118, and the substrate may be severed or separated into two separate portions 124, 126, as shown in FIG. 3. In this example, the process path 118 is a closed path located within the perimeter or boundaries of the starting substrate 112. In other examples, the process path 118 and resulting line of separation extend to at least one edge of the substrate 112.

When portions 124, 126 are initially separated, opposing surfaces or edges 128, 130 are formed along each of the respective separate portions. Each of the newly formed surfaces 128, 130 may be referred to as a separation surface. When separated along a series of laser-induced channels, the newly formed edges 128, 130 may be relatively smooth and absent sharp features, without the need for post-processing such as grinding, even with substrates such as glass, with which grinding of the edges is typically required to remove sharp edges after traditional separation techniques like mechanical scribing. Another characteristic of this type of material separation or singulation is that it is essentially a zero-kerf separation technique. In contrast to some laser cutting processes, the laser-induced channel separation process does not remove any measurable amount substrate material—e.g., the outer perimeter of inner portion 124 and the inner perimeter of outer portion 126 are the same size and shape. As described further below, certain characteristics of the separation surfaces 128, 130, such as the roughness of each surface, can be controlled via one or more laser process parameters.

Figure 4:
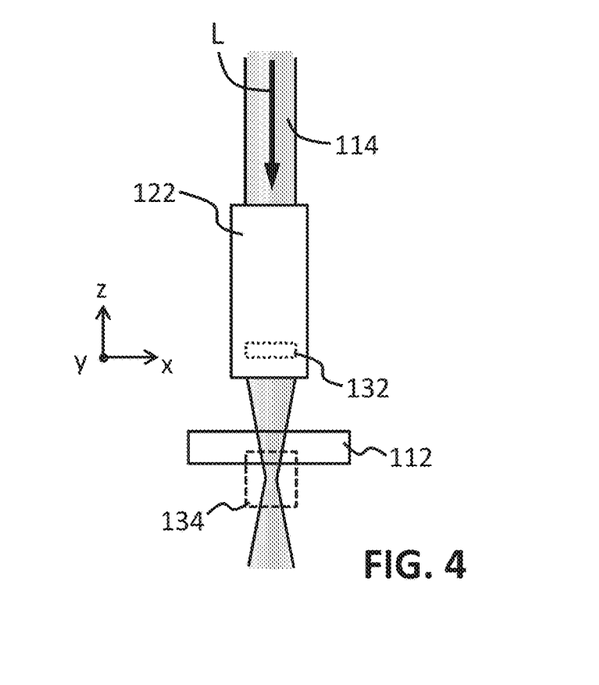
FIG. 4 is a schematic view of a portion of an illustrative laser system, including an optical element.

A brief description of the manner in which laser-induced channels can be formed in a transparent or partially transparent substrate is provided with reference to FIGS. 4-7. In the example of FIG. 4, the optical assembly 122 of the laser system includes optical element 132. The optical assembly 122 is configured to receive the laser beam 114, alter a characteristic of the laser beam, and emit the altered laser beam in a direction of light propagation L (parallel with the z-axis in this example), such as toward the substrate 112. In the example of FIG. 4, the optical assembly 122 includes a focusing optical element 132, such as a lens, that narrows the laser beam 114, thereby increasing the power density of the laser beam in the z-direction for some distance beyond the optical assembly 122. The power density referred to here is the average power per unit area, where the area is the cross-sectional area of the beam measured in a plane perpendicular with the direction of light propagation (i.e., the x-y plane in FIG. 4). Without the substrate 112 in the path of the laser beam 114, the power density of the beam reaches a maximum along the z-direction in a nominal or geometric focal region 134, beyond which the power density of the beam decreases as the beam diverges or diffuses. As used herein, the terms "power" and "energy" may be used somewhat interchangeably, as skilled artisans will understand that the two terms are related by time or duration. For instance, the energy available from a laser beam of a particular power or wattage within a particular amount of time is generally the product of the laser power and the time. Thus, a timed pulse of laser energy of a known power has an associated amount of available energy.

The energy in a pulse of the laser beam 114 also has a distribution along the direction of light propagation L that is a function of distance in the direction of light propagation.

In other words, the total amount of energy in a laser pulse of a particular duration propagates through the optical assembly 122 and is distributed at various distances from the last optical element the beam encounters and in various corresponding amounts at each distance. This energy distribution is referred to herein as the focal energy distribution. As used here, a laser pulse refers to both a single, uninterrupted pulse and to a rapid burst of pulses. For instance, a laser operating at a pulse frequency of 100 kHz may deliver a particular amount of energy (i.e., the product of the laser power and total pulse time) 100,000 times per second—i.e., once every 10 µs. Depending on the amount of energy delivered every 10 µs, it may be delivered in a single uninterrupted pulse or in a plurality of pulses on the nanosecond scale.

Where the substrate 112 is at least partially transparent to the particular wavelength of laser light, self-focusing of the light beam can occur due to the Kerr effect. Generally, the Kerr effect is the change in the refractive index of a material in response to an electric field. The optical Kerr effect is the case in which the electric field is due to the light itself. In such cases, the index of refraction of the material increases as a function of increasing light intensity. As the refractive index increases, the beam of light is focused further due to the differential increase in index in the center of the beam. This focusing, called self-focusing, causes a further increase in the intensity, and thus the index of refraction. In a scenario in which this self-focus process is not limited by another process, the beam of light may cause a catastrophic self-focus event in which an internal volume of the substrate is damaged once a certain intensity threshold is reached. The threshold may be specific to the material composition, and the intensity may be a particular amount of energy per unit mass or volume. Thus, placing a Kerr material in the path of the beam 114 alters the focal energy distribution of the beam away from the nominal condition due to both its linear index of refraction and its non-linear effects.

When the focal energy distribution of the beam is such that the damage threshold of the substrate material is reached at a distance from the final optic that is within the thickness of the substrate, an array of one or more self-focus damage volumes is formed approximately along a line and about an axis in the direction of light propagation L. This array of one or more self-focus damage volumes is referred to as a laser-induced damage channel or a laser-induced channel. In some cases, the array of damage volumes is sufficiently large in number and/or the individual damage volumes of the array are sufficiently large in size that the resulting laser-induced channel extends through the entire thickness of the substrate. It has been found that the spacing between individual damage volumes and/or the size of the individual damage volumes along one laser-induced channel is related to the focal energy distribution. For instance, as the energy density along a focal region decreases, the damage spots that make up the laser-induced channel can have a lower apparent presence (e.g., smaller, spaced farther apart, and/or less visible). As the energy density along a focal region increases, the damage spots of the laser-induced channel can have a greater apparent presence (e.g., larger, spaced closer together, and/or more visible). As used here, a focal region is defined between two planes spaced different distances from the final optical element. The focal region may be located generally along the line of light propagation, but the light may be focused along a focal path that deviates from the line of light propagation or the direction of light propagation. The laser-induced channel need not to be perpendicular to the surface plane of the optical element nor parallel to the line of light propagation.

Figure 5:
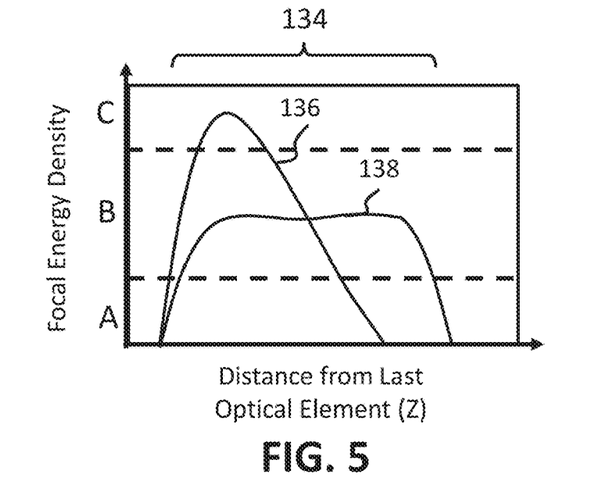
FIG. 5 illustrates examples of uniform and non-uniform focal energy distributions.

FIG. 5 depicts examples of a non-uniform focal energy distribution 136 and a relatively uniform focal energy distribution 138. At distances Z where the energy density is highest (C), the intensity (e.g., size and/or number) of the damage volumes may be highest, while at relatively low (A) and intermediate (B) energy densities, the intensity of the damage volumes is correspondingly low and moderate. An approximately uniform focal energy distribution can enhance uniformity of the damage along the length of a laser-induced channel. But such a uniform focal energy density is not necessarily typical with a typical laser beam profile, such as a Gaussian distribution across the width of the beam, emitted from a typical focusing lens.

According to at least one embodiment, the optical assembly includes an optical element specifically configured to receive a laser beam with a known beam profile and emit the laser beam with a different beam profile, where the emitted beam profile produces a generally uniform focal energy distribution in a focal region. In one example, the optical element is an aspheric lens shaped and configured to provide an approximately uniform distribution of energy along a particular focal region. A lens or other optical element can be configured to receive a laser beam with any shape, size, and/or energy profile, such as Gaussian, flat-top, or other energy profiles. In one example, a linear ray tracing technique is used, along with the known refractive index of a particular substrate material, to determine the laser beam profile required to produce a uniform focal energy distribution along the desired portion (some or all) of the thickness of the substrate. A custom optical element that is shaped to receive a beam of a known profile and emit the beam with the profile required to produce the uniform focal energy distribution can then be designed and fabricated.

Figure 6:
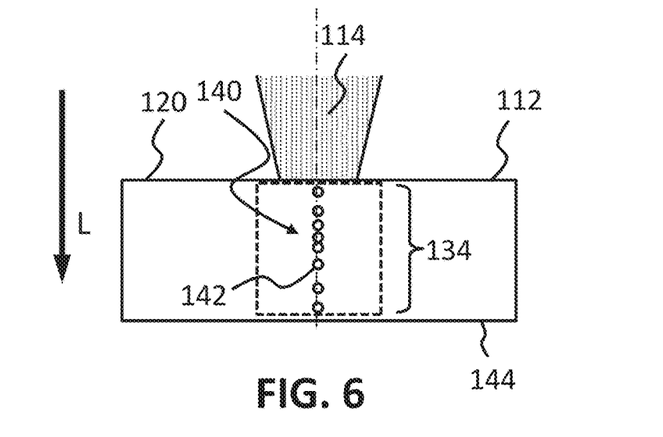
FIG. 6 is a schematic view of a laser-induced channel with a non-uniform array of damage volumes.

Another technique for determining the desired beam profile includes non-linear ray tracing, where the changing refractive index of the Kerr material is accounted for. It is also noted that a uniform focal energy distribution, while typically providing more uniform damage volumes along a laser-induced channel than does a non-uniform focal energy distribution, does not necessarily provide uniform spacing between individual damage volumes or locations in the array of damage volumes. FIG. 6 illustrates an example of a laser-induced channel 140 including an array of self-focus damage volumes 142, where the spacing of the damage volumes is non-uniform along the length of the channel between entry and exit surfaces 120, 144 of the substrate 112. This may result even with the optical assembly designed to provide a uniform focal energy density, particularly where the non-linearity of the refractive index of the substrate is not accounted for in the optic element design.

Figure 7:
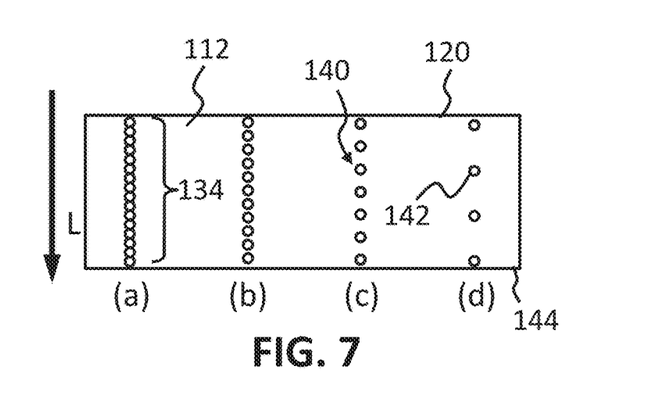
FIG. 7 is a schematic view of multiple laser-induced channels, each with a uniform array of damage volumes.

Non-linear ray tracing may be used to design, configure, and fabricate an optical element that produces an array of uniformly spaced damage volumes 142 along each laser-induced channel 140. Non-linear ray tracing accounts for the dependence of the refractive index of the material on local electric field intensity. Non-linear ray tracing may be done iteratively in time since the propagation of each ray depends on the propagation of every other ray. In linear ray-tracing, on the other hand, the rays may be propagated independently. Some examples of laser-induced channels with uniformly spaced damage volumes are shown in FIG. 7. From left to right in FIG. 7(a)-(d), high to low density arrays are illustrated. In some cases, uniform spacing among the damage volumes of the arrays is preferred, as it may provide a more uniform finished appearance and/or tactile feel along the laser-separated edges. Here again, the optical element configured to alter the laser beam profile to produce a uniform distribution of damage volumes along a laser-induced channel may be an aspheric lens.

Though uniformity in the focal energy distribution and/or the spacing within an array of damage volumes of a laser-induced channel may be preferred in some cases, an optical element may be configured with a specialized focal energy distribution to target particular portions of a focal region with a particularly higher or lower focal energy density. Changing the distribution of energy within the beam is also not the only way to affect the resulting focal energy distribution. For example, the direction and/or shape of the beam may be altered. In one embodiment, the optical assembly is configured to emit a beam with a non-circular cross-section, such as an elliptical cross-section. The focal energy distribution may also be altered by altering the orientation of the beam. For instance, impinging the substrate at different angles changes the path of different portions of the beam through the substrate, particularly where self-focusing is implicated.

The above-described techniques for predictably controlling the focal energy distribution are advantageous for a number of reasons. For example, laser-induced channels can be formed with a greater length (i.e., completely through thicker substrates) than previously thought possible with a given laser wattage. Previous attempts at increasing laser-induced channel length relied on experimenting with laser and set-up parameters in hopes of empirically arriving at a longer channel length. Predictably controlling the focal energy distribution as described above enables more efficient use of the energy available in a given laser pulse by directing more of the available energy to locations where it can contribute to the damage volumes within the substrate, rather than relying on the inherent path of the light in a Gaussian beam profile through the substrate, for example, where a greater portion of the light energy is absorbed, scattered, or otherwise redirected and not focused form damage volumes in the material as intended. Laser-induced channels can be formed in a glass substrate with a length of more than 3 mm and up to 6 mm or more with proper beam conditioning.

Additionally or alternatively, as demonstrated below, this more efficient usage of the energy available in a laser energy pulse can be used to create damage volumes with larger radial (or x-y) dimensions. Laser-induced channels can be formed in a glass substrate with a diameter or average width of more than 3 µm and up to 8 µm or more with sufficient beam conditioning. It is also possible to form laser-induced channels with a diameter or average width down to about 1 µm. Larger width damage volumes and the resulting larger width laser-induced channels can allow for larger spacing between adjacent channels along the process path. And greater channel-to-channel spacing allows for increased speed of movement of the laser spot along the substrate and, thus, shorter process times. The focal energy distribution can also be tailored, by proper optical element design, to provide regions of very low and/or very high energy density within the distribution. For instance, the exit surface 144 (opposite the entry surface 120 of FIG. 6) of the substrate may include a coating disposed thereon. A locally high energy density can be used to remove the coating, or a locally low energy density can be used to preserve the coating. Or it may be desired to remove or preserve a coating or some other material layer between two substrates, and the focal energy distribution can be tailored to respectively increase or decrease the energy density in the particular focal region of interest.

Figure 8:
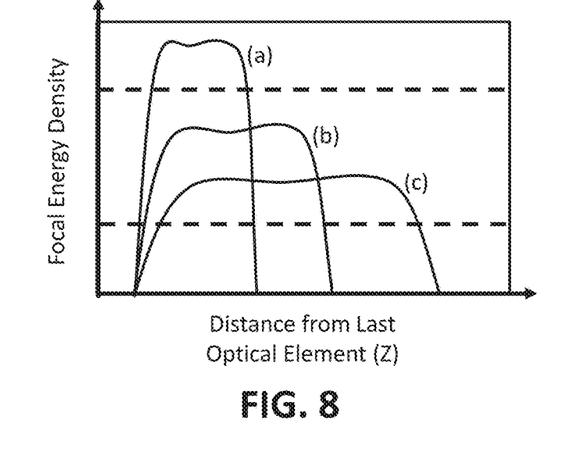
FIG. 8 illustrates examples of multiple uniform focal energy distributions, each with a different focal energy density and focal region length.

FIG. 8 illustrates three possible focal energy distributions as a function of distance from the last optic, where the total energy in each distribution (the area under each curve) is approximately the same. As indicated here, with a laser pulse having a particular amount of energy available, it is possible to design an optical assembly that focuses most or all of the available energy over relatively shorter (a) and longer (c) focal regions. The effect of shortening the focal region for a given energy pulse is an increased focal energy density in that focal region, since the total energy is maintained.

The focal energy density can alternatively or additionally be adjusted by changing the laser pulse energy (or the laser power for a given pulse frequency). For instance, a particular laser source is typically capable of producing a laser beam with a maximum power or wattage, which, at a certain pulse frequency, yields a maximum pulse energy. This places a practical limitation on the maximum attainable focal energy density over a particular focal region, with higher focal energy densities being possible with shorter focal regions.

Because adjusting laser power may generally be easier than designing and producing new optics with a different characteristic focal energy distribution, it is useful to use a focal energy distribution that does not require the laser to operate at maximum power for a given substrate and substrate thickness. This opens the laser process window even further, such that adjustments can be made to the size, shape, location, and/or spacing of the laser-induced channels. In some embodiments, these adjustments to the laser-induced channel characteristics can be used to impart particular characteristics to the separation surfaces or newly formed edges of separated substrate portions. In one example, the average roughness of each newly formed edge can be controlled as a function of one or more laser process parameter. In one particular embodiment, the average roughness of each formed edge can be controlled or pre-determined by adjusting the laser power.

Figure 9:
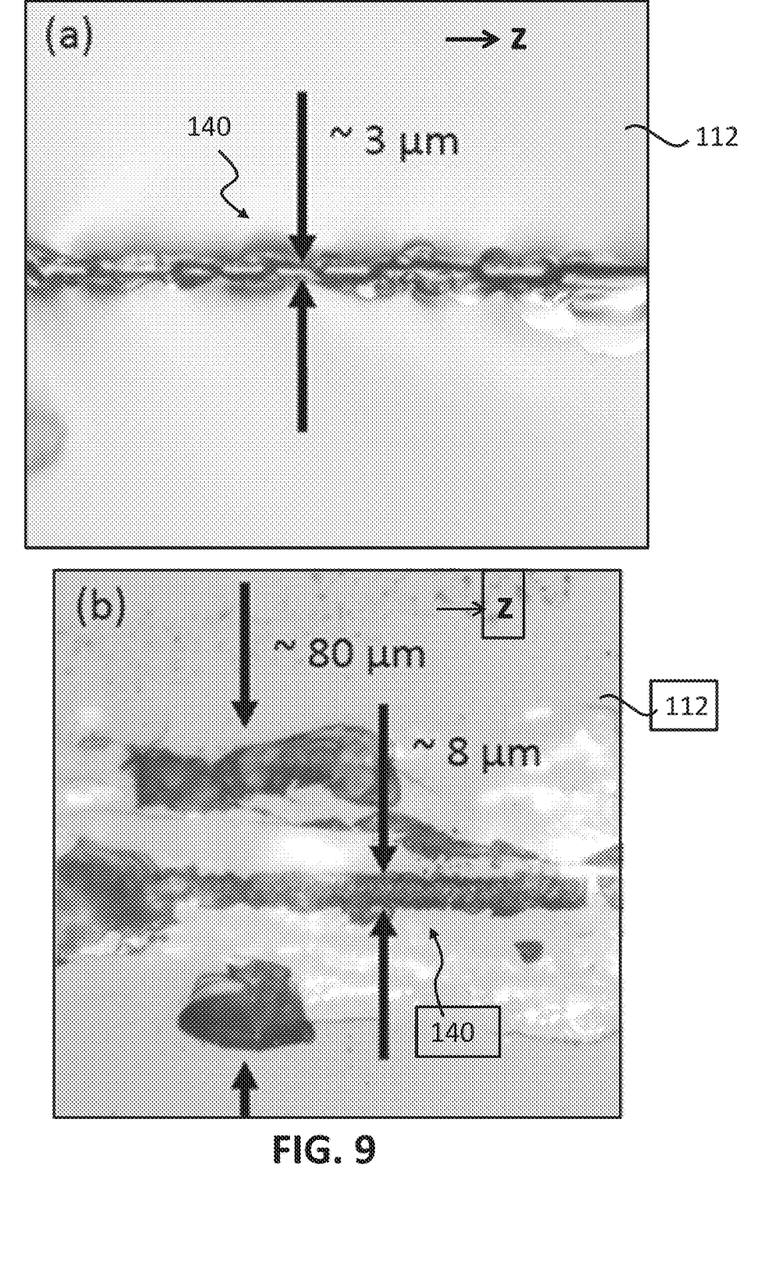
FIG. 9 includes photomicrographs of two different laser-induced damaged channels with damage volumes of different sizes.

A higher focal energy density has been observed to form larger damage volumes in a transparent substrate; namely, larger diameter damage volumes. As shown in the photomicrographs of FIG. 9, a relatively lower focal energy density (a) can form a damage volume with a diameter or width of about 3 µm, and a relatively higher focal energy density can form a damage volume with a diameter or width of about 8 µm. Damage volumes down to 1 µm or less or between 1 µm and 8 µm are also possible. The thickness direction of the substrate is shown as the z-direction in FIG. 9, which is also the direction of light propagation. The substrate of FIG. 9(a) shows a few larger features where cracks began forming away from the laser-laser induced channel, while the substrate and FIG. 9(b) includes significantly more scattered damage with a largest width of about 80 µm.

Figure 10:
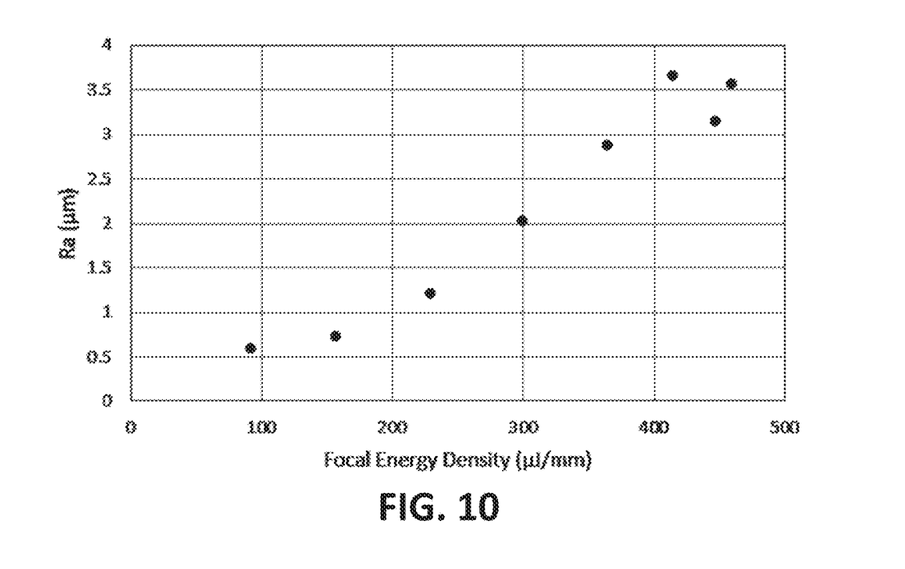
FIG. 10 is a plot of roughness along laser-separated edges with respect to the focal energy density used to form laser-induced channels along which the edges were formed.

FIG. 10 is a plot of the measured roughness of a separation surface or edge formed along a series of laser-induced channels as a function of laser power for a fixed focal energy distribution and a fixed inter-channel spacing along the line of separation. For purposes of FIG. 10, the laser power is converted to a theoretical/calculated focal energy density. Focal energy density was calculated by dividing the total pulse energy delivered to each individual channel location (i.e., the sum of the energies in a pulse burst) by the estimated length of the focal region. The units are thus in the form of energy per unit length of the focal region, which assumes a uniform focal energy distribution with the same width as the focal region and no energy losses (e.g., portions of the laser light passing through the substrate and not contributing to damage volumes). The units for focal energy density could alternatively be energy per unit volume or energy per unit mass by selecting a characteristic diameter or columnar cross-sectional area coinciding with the laser-induced channel. But variability the in the energy distribution in the radial direction is not fully known or necessarily controlled, and selecting such a characteristic diameter is thus somewhat arbitrary and has no effect on the qualitative nature of the plot.

Figure 11:
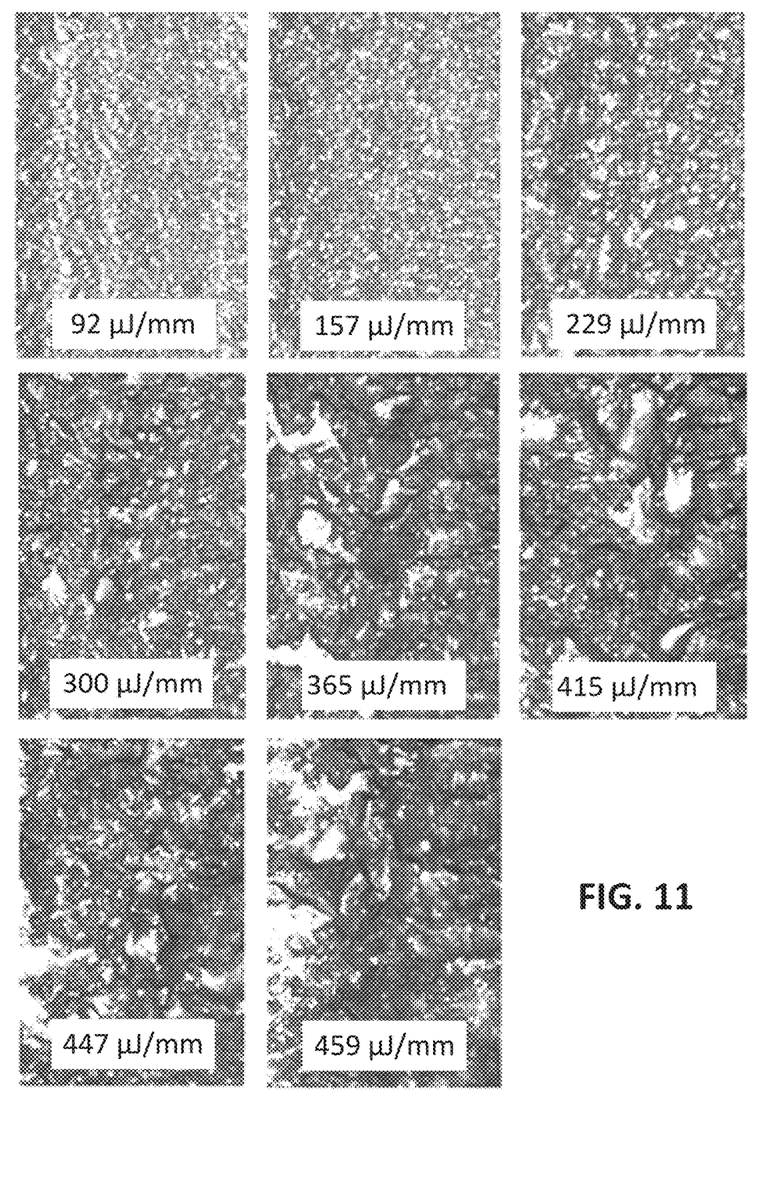
FIG. 11 is a series of photomicrographs illustrating the appearance of the laser-separated edges that are the subject of FIG. 10.

Roughness was measured along the length of the formed edge (perpendicular to the thickness direction) using a profilometer and reduced to a single value, Ra. As illustrated here, the roughness of the laser-separated edges generally increases with laser power. Thus, the roughness of a laser-induced-channel edge may be tuned or controlled by adjusting the laser power. FIG. 11 includes photomicrographs of the separation surfaces formed at each of eight different focal energy densities (i.e., laser powers). These images qualitatively demonstrate the correlation between laser pulse energy and finished surface roughness for a particular uniform focal energy distribution, substrate, and inter-channel spacing.

It has also been found that inter-channel spacing beyond the ranges shown in FIGS. 10 and 11 are possible and that the spacing can have an effect on edge roughness. Inter-channel spacing as low as 1 micron is attainable. With such relatively small inter-channel spacing, adjacent channels may begin to partially overlap making the individual channels more difficult to discern. The resulting edge roughness is generally at the low end or lower than the range shown in FIG. 10.

As noted above, the maximum attainable length for a laser-induced channel is limited by the amount of energy available in a laser pulse—i.e., the length of the focal region along which the available energy is distributed will reach a maximum value when the focal energy density along some portion of the focal region falls below the threshold damage value for the substrate material. Thus, in some cases, the length of the laser-induced channels and the desired edge roughness may be competing interests and may need to be balanced against each other in a particular application. In one embodiment, such as where relatively long laser-induced channels are desired (e.g., a relatively thick substrate) without regard for edge roughness, the energy available in a laser pulse is distributed along the desired focal region with a focal energy density above the damage threshold of the material. In another embodiment, such as where a very fine surface finish is desired, the energy available in the laser pulse is distributed along the desired focal region and the power is reduced to just above the damage threshold of the material or to the lowest level at which interruptions appear in the formed channels.

As described below, edge roughness or other separation surface characteristics may also be affected by the size and/or spacing of the laser-induced channels. An optimum inter-channel spacing may exist for a particular laser system and may depend on the focal energy distribution, the laser pulse energy and frequency, substrate material parameters (e.g., damage threshold, first and second order refractive indices, absorption, thermal conductivity and diffusivity), the size of the damage volumes, and/or other parameters that affect the damage caused by the laser pulse.

It has been observed that an inter-channel spacing that is too small can affect the very formation of the channels, as a newly formed channel may affect the formation of the adjacent and subsequently formed channel. An already-formed channel that is too close to the desired location of another channel can absorb and/or reflect incoming light, leading to heat accumulation and the formation of significant cracks and fractures. A maximum spacing threshold has also been observed, above which the material damage threshold effectively increases. Thus, for a given optical set-up there exists an inter-channel spacing above which the channels become less intense and/or shorter, possibly leading to a visible banded appearance along the length of the channels.

As noted above, one of the additionally expanded processing windows realized as a result of the above-described techniques for predictably controlling the focal energy distribution of the laser is the ability to increase the inter-channel spacing. One advantage of increased inter-channel spacing is faster process cycle times. The increased inter-channel spacing is at least partly enabled by the ability to distribute the available laser pulse energy in a manner that forms relatively large width or diameter damage volumes within the substrate. These larger diameter damage volumes and channels allow the cracks that facilitate material separation to form between adjacent laser-induced channels that are spaced farther apart. For instance, cracks can form more easily between two 8 µm channels that are 40 µm apart than between two 3 µm channels that are 40 µm apart, particularly when the increased focal energy density used to form the larger diameter channels results in more scattered damage extending away from the formed channel (e.g., in FIG. 9(b)). The ease of crack formation determines how easily the substrate may be separated into separate portions.

For a given laser power and laser pulse frequency which yields a pulse energy that creates a desired laser-induced channel, increased inter-channel spacing can be achieved by increasing the speed at which the laser spot 116 (FIG. 2) moves along the impingement surface of the substrate. In one example, for a given laser system with a particular laser power, the laser spot moves along the substrate at a speed of 500 mm/sec and forms laser-induced channels with a characteristic width of about 3 µm. It has been observed that increasing the channel damage width (e.g., to about 8 µm) by providing a tailored focal energy distribution enables much higher speeds along the process path with the same pulse energy and pulse frequency. Effective speeds as high as 4000 mm/s have proven possible.

These relatively large laser-induced channels and the correspondingly larger possible inter-channel spacing can also impart the separation surfaces with relatively high roughness. For instance, an edge produced with an inter-channel spacing of 40 µm will have a roughly periodic structure with a period of 40 µm. When compared to edges produced with smaller width channels at more modest speeds (i.e., lower inter-channel spacing) the roughness is much higher, but may be sufficient for certain applications, such as singulation of large sheets into smaller pieces (e.g. in a glass float line) which are further processed. Also, in application where the finished edge is covered or not visible, relatively high roughness values may be acceptable, particularly when weighed against the much higher processing speeds.

Thus, one or more characteristics, such as roughness, of the separation surfaces may be controlled via one or more laser process parameters. These parameters include laser power and focal energy distribution, as noted above. Because inter-channel spacing and laser-induced channel width can also affect surface properties such as roughness, the speed of the laser spot along the substrate (i.e., inter-channel spacing) and focal energy density (i.e., damage volume) can also contribute to the ability to control such surface properties.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method comprising:
   forming a plurality of laser-induced channels in a substrate along a process path such that the plurality of laser-induced channels extend between a first surface and an opposing second surface of the substrate, at least partially defining a separation surface;
   separating the substrate into a first portion and a second portion along the process path such that the separation surface of each of the first portion and the second portion has a roughness in a range from 0.6 to 3.7 micron Ra; and
   controlling the roughness of the separation surfaces by adjusting a process parameter, the process parameter including at least one of a size of a diameter of the laser-induced channels or a spacing between adjacent laser-induced channels.

2. The method of claim 1, wherein forming the plurality of laser-induced channels in the substrate along the process path includes delivering a pulse of laser light to the substrate at an intended laser-induced channel location, and wherein controlling the roughness of the separation surfaces by adjusting the process parameter includes adjusting an amount of available energy in the pulse of laser light.

3. The method of claim 1, wherein controlling the roughness of the separation surfaces by adjusting a process parameter comprises adjusting a speed of a laser spot along the process path.

4. The method of claim 1, wherein controlling the roughness of the separation surfaces by adjusting a process parameter comprises adjusting a laser pulse frequency.

5. The method of claim 1, wherein forming the plurality of laser-induced channels in the substrate along the process path includes delivering a pulse of laser light to the substrate at an intended laser-induced channel location, and wherein controlling the roughness of the separation surfaces by adjusting the process parameter includes adjusting a shape of a focal energy distribution in a focal region located to coincide with the substrate.

6. A product, comprising:
   a substrate having:
      a first surface;
      an opposing second surface; and
      a plurality of laser-induced channels extending between the first surface and the opposing second surface, the plurality of laser-induced channels at least partially defining a separation surface that extends between the first surface and the opposing second surface, wherein each of the plurality of laser-induced channels at least one of has a target diameter or is spaced a target distance from adjacent laser-induced channels to provide a roughness of the separation surface upon separation in a range from 0.6 to 3.7 micron Ra.

7. The product of claim 6, wherein the target diameter of the laser-induced channels is in a range from 1 to 8 microns.

8. The product of claim 6, wherein the target distance between the adjacent laser-induced channels is in a range from 1 to 40 microns.

9. The product of claim 6, wherein the substrate is glass.

10. The product of claim 6, wherein each of the plurality of laser-induced channels has the target diameter and is spaced the target distance.

11. A product, comprising:
    a substrate having:
       a first surface;
       an opposing second surface; and
       a plurality of laser-induced channels extending between the first surface and the opposing second surface, the plurality of laser-induced channels at least partially defining a separation surface that extends between the first surface and the opposing second surface, wherein a roughness of the separation surface upon separation is a function of at least one of the size of the diameter of the laser-induced channels or the spacing between adjacent laser-induced channels such that the roughness of the separation surface is in a range from 0.6 to 3.7 micron Ra, and wherein at least one of (i) the diameter of the laser-induced channels is in a range from 1 to 8 microns or (ii) the spacing between the adjacent laser-induced channels is between 1 and 40 microns.

* * * * *